United States Patent Office 3,486,526
Patented Dec. 30, 1969

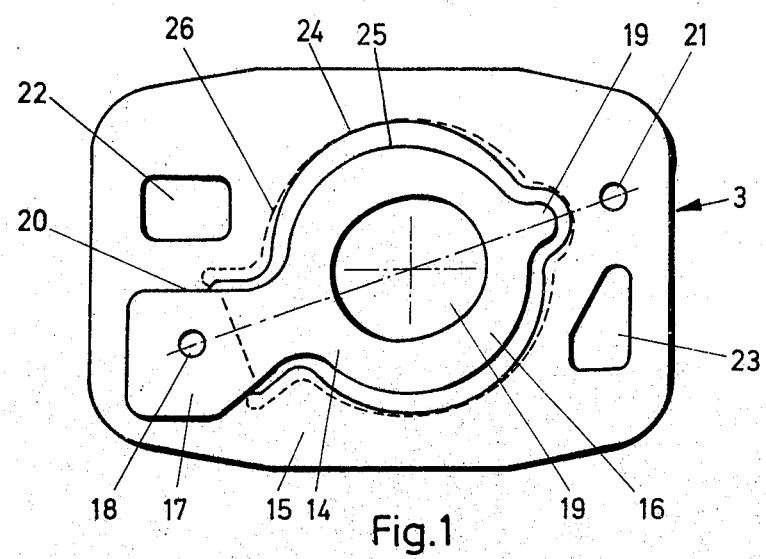
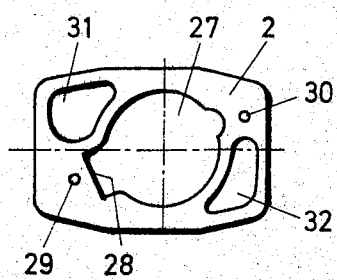
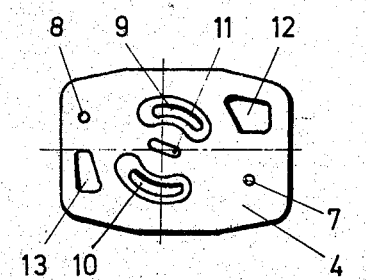
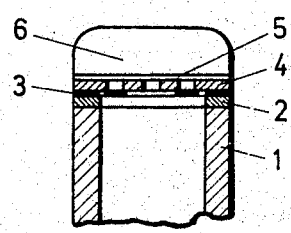

3,486,526
LEAF SPRING VALVE FOR COMPRESSORS, PARTICULARLY FOR SMALL REFRIGERATING MACHINES, AND METHOD OF FITTING IT
Bendt Wegge Larsen, Augustenborg, Denmark, assignor to Danfoss A/S, Nordborg, Denmark, a company of Denmark
Filed Jan. 17, 1968, Ser. No. 698,585
Claims priority, application Germany, Jan. 21, 1967, D 52,076
Int. Cl. F16k 25/00, 51/00
U.S. Cl. 137—454.4                                4 Claims

ABSTRACT OF THE DISCLOSURE

The invention relates to leaf-spring valve assemblies for compressors of the type used for small refrigerating machines.

The leaf spring valve assembly comprises two main parts which are a sealing plate and a spring blade. The spring blade operates as a cantilever and has a fixed end referred to herein as an extension. The leaf spring valve assembly is sandwiched between a valve plate on top, which has two studs, and a hard sealing member on the bottom.

The invention is directed towards providing an opening in the sealing plate for receiving the extension portion of the spring blade which provides a very close fit between these parts and prevents relative movement therebetween in the plane in which the parts are disposed. The two parts are restrained from moving jointly or as a unit in the plane in which they are disposed by the provision of one stud which extends through an opening in the blade extension and a second diametrically oppositely disposed stud which extends through an opening in the sealing plate.

The invention relates to a leaf-spring valve for compressors, particularly for small refrigerating machines, and having a spring blade attached to an extension, as well as to a method of fitting said valve. In combination with a valve plate carrying the valve seating or seatings, such leaf-spring valves can be used as a suction valve and also as a pressure valve.

Leaf-spring valves are known wherein the extension of the spring blade has two holes whereby it can be fitted over complementary centering pins. Between the valve plate and the component adjacent the other side, e.g. the cylinder, there is fitted a soft sealing member into which the extension of the spring blade can press. This form of leaf-spring valve cannot however be used in conjunction with the so-called hard sealing members, such as are often used for distancing purposes, for example in adjusting the dead space.

Valve plates, combined with hard sealing members, are known which extend over the entire area of the adjacent parts and which are stamped out in the middle in such manner that a blade-like element is provided which is connected at one or both ends to the plate outside the stamped-out portion. The spring blade, disposed in the middle, is also held in position by means of two holes in the outer part.

These valve plates can be machined to the required accuracy only with some difficulty. If a plate slides between the blade and surrounding portion of another plate, the blade is bent out so that the valve plate becomes unusable. The tool for stamping out the blade becomes quickly worn, since it can only be of small wall-thickness. Nevertheless, the stamped-out sheet increases the dead space in a disruptive manner.

The object of the invention is to provide a leaf-spring valve which can be used in conjunction with a hard sealing member, but which does not exhibit the disadvantages of the known valve plate and which provides further advantages without extra cost and effort.

According to the invention this object is achieved by fitting the extension into an opening in a metal sealing plate which surrounds the spring blade and is of the same thickness as the spring blade.

In contrast to the known valve plate, the blade and its surrounding sealing plate are here produced separately from each other. Despite this, the fitting is not made more difficult since, owing to the engagement of the extension of the blade in the opening of the sealing plate, mutual locking of the parts is achieved. Also, as the result of their being produced separately, the parts of the sheet cannot slip into each other and press up the blades of another sheet part. All that is necessary is for the blade to be precisely machined; unmachined edges of the surrounding sealing plate cause no trouble, but may even enhance the sealing action. Advantageously, the blades can be stamped out in such manner that in the longitudinal direction they coincide with the direction of rolling, so that a greater strength is obtained. For stamping out the sealing plate and the blade, use can be made of punches of any wall-thickness and having a longer service life. Since the stamping operation is carried out independently, the gap between the blade and the sealing plate can be kept as small as required and the dead space therefore reduced.

A particularly simple and reliable locking in their respective positions can be achieved if the extension of the blade contains a hole and the sealing plate also has a hole each for accommodating a centering stud. Whereas at least two studs have hitherto been necessary for fixing one valve component, in the present case two studs are sufficient for reliably fixing two components.

The hole in the sealing plate is preferably disposed diametrally opposite the hole in the extension. In order to utilize the cross-section in a uniform manner, the two holes should be disposed roughly along one diagonal of the layer consisting of the valve blade and the sealing plate and the orifices for admitting the gas should be provided roughly along the other diagonal of the sealing plate.

A preferred method of fitting the leaf-spring valve according to the invention consists in applying an adhesive, e.g. oil, to a valve plate provided with centering studs, then fitting the valve blade on one stud and the sealing plate on the other stud and rotating the two parts relatively to each other until the extension of the blade engages in the opening in the sealing plate. When the parts have been latched into their final positions, because of their good surfaces and with the help of the adhesive, they stick so firmly to the valve plate that the latter, the valve blade and the sealing plate can be further dealt with as a single component.

The invention will now be explained in more detail by reference to an embodiment illustrated in the drawing, wherein:

FIG. 1 shows a plan view of a leaf-spring suction valve constructed in accordance with the invention, FIG. 2 shows, on a smaller scale, a plan view of an associated hard sealing member, FIG. 3 illustrates on a smaller scale the bottom plan view of an associated valve plate, and FIG. 4 shows a diagrammatic longitudinal section through these parts fitted on a cylinder.

Fitted one above the other on a cylinder 1 of a compressor are a hard sealing member 2, the leaf-spring suction valve arrangement according to the invention, the valve plate 4, a packing member 5 and a cylinder head 6. The two last-named parts are not shown in section, since they do not contribute anything to the understanding of the invention.

The valve plate 4 carries two studs 7 and 8 and contains two orifices 9 and 10 for the suction gas and an orifice 11 for the pressure gas, as well as two inlet openings 12 and 13 for supplying the gas to the cylinder head. The orifices 9 and 10 on the one hand, and 11 on the other, form, on opposite sides, the valve seatings for the suction valve and the pressure valve.

The leaf-spring suction valve arrangement 3 consists of an inner plate part 14 and an outer plate part 15. The inner part 14 forms a valve blade 16 and has an extension 17 containing a hole 18 which fits over the stud 7. The valve blade is annular with a central opening 19 whereby the orifice 11 for the pressure gas is kept open. The blade also has a projecting stop 19'. The outer part 15 of the plate is a sealing plate which surrounds the blade 16 and has an opening 20 which fits closely around the extension 18. The sealing plate 15 contains a hole 21, which is pushed over the stud 8, and two orifices 22 and 23 which register with the orifices 12 and 13. Since the two parts 14 and 15 are produced separately, the two stamping lines 24 and 25 need to be only a relatively small distance apart. In contrast to this, the stamping edge 26, shown by the broken line, had previously to be spaced a large distance away from the edge 25 because of the necessary wall-thickness required in the stamping tool.

The hard sealing member 2 contains a central opening 27 which has an edge 28 over which the spring-blade 16 can be bent down. Holes 29 and 30 are for receiving the studs 7 and 8. The openings 31 and 32 register with the openings 12, 13 and 22, 23 respectively. Holes are also provided in the end-face of the cylinder in which the studs 7 and 8 engage.

When carrying out the fitting, the underside of the valve-plate 4 is smeared with oil or some other adhesive. The two parts 14 and 15 are then pushed separately on to the associated studs 7 and 8 and are rotated relatively to each other until they become mutually locked in their final positions. The dead space of the cylinder is then measured. Dependent upon this, a suitable sealing member is selected from a number of hard sealing members of different thickness, and is fitted on to the studs 7 and 8 and the whole assembly is then placed on the cylinder.

I claim:
1. A leaf spring valve assembly adapted to be mounted on a compressor cylinder, comprising, a leaf spring blade having an anchoring portion and a movable portion, a sealing plate having a generally centrally disposed opening for receiving said blade with a portion of said opening being in closely fitting relation to said blade anchoring porton, said anchoring portion being in the same general plane as and having the same thickness as said sealing plate.

2. A leaf spring valve assembly according to claim 1 wherein said anchoring portion of said spring blade and said sealing plate each have only a single stud hole through which stud means are extendable.

3. A leaf spring valve assembly according to claim 2 wherein said stud holes are on diametrically opposite sides of said cylinder.

4. A leaf spring valve assembly according to claim 3 wherein said sealing plate has two gas passage holes disposed on diametrically opposite sides of said cylinder and in angularly spaced relation to said stud holes.

References Cited

FOREIGN PATENTS

| | | |
|---|---|---|
| 861,615 | 2/1961 | England. |
| 737,908 | 10/1955 | England. |
| 1,153,580 | 8/1963 | Germany. |
| 1,003,119 | 1/1965 | England. |

ALAN COHAN, Primary Examiner

W. H. WRIGHT, Assistant Examiner

U.S. Cl. X.R.
137—479, 516.15